US012426028B2

(12) United States Patent
Ouchi

(10) Patent No.: US 12,426,028 B2
(45) Date of Patent: Sep. 23, 2025

(54) COMMUNICATION APPARATUS USING FRAME CONTROL PROCESSING, CONTROL METHOD OF COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Masatomo Ouchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 169 days.

(21) Appl. No.: 18/327,803

(22) Filed: Jun. 1, 2023

(65) Prior Publication Data
US 2023/0309076 A1  Sep. 28, 2023

Related U.S. Application Data

(63) Continuation of application No. 17/318,490, filed on May 12, 2021, now Pat. No. 11,706,748.

(30) Foreign Application Priority Data

May 14, 2020 (JP) ................................. 2020-085495

(51) Int. Cl.
*H04W 72/0453* (2023.01)
*H04W 72/51* (2023.01)
*H04W 74/06* (2009.01)

(52) U.S. Cl.
CPC ....... *H04W 72/0453* (2013.01); *H04W 72/51* (2023.01)

(58) Field of Classification Search
CPC .......................... H04W 72/0453; H04W 74/06
(Continued)

(56) References Cited

U.S. PATENT DOCUMENTS 10,966,251 B2 * 3/2021 Ahn ...................... H04B 7/0452
11,330,625 B2 * 5/2022 Min ........................ H04L 5/001
(Continued)

FOREIGN PATENT DOCUMENTS

JP        2020504570 A       2/2020

OTHER PUBLICATIONS

Zhou Lan (Broadcom Inc.), et al.; "11ax D3.0 MAC Comment Resolution for Bandwidth Queue Report"; Aug. 2018; CR BQR section 27.5.2; IEEE 802.11-18/1515r4; IEEE; Internet <URL:https://mentor.ieee.org/802.11/dcn/18/11-18-1515-04-00ax-cr-bqr-section-27-5-2.docx >; Sep. 13, 2018; pp. 1-5.

*Primary Examiner* — John Pezzlo
(74) *Attorney, Agent, or Firm* — Canon U.S.A., Inc. IP Division

(57) ABSTRACT

A communication apparatus complying with an IEEE802.11 series standard, determines, based on information received from another communication apparatus connected to the communication apparatus, whether UL MU (Uplink Multiuser) communication of the other communication apparatus is enabled or disabled, acquires, from the other communication apparatus by a method according to a result of the determination, a BQR (Bandwidth Query Report) representing a state of a communication resource usable by the other communication apparatus, and decides the communication resource used to communicate with the other communication apparatus based on the acquired BQR.

11 Claims, 11 Drawing Sheets

(58) Field of Classification Search
USPC .................................. 370/252, 329, 430, 449
See application file for complete search history.

(56) References Cited

U.S. PATENT DOCUMENTS

| | | | |
|---|---|---|---|
| 11,979,827 B2* | 5/2024 | Chitrakar | H04L 5/0098 |
| 2018/0132228 A1* | 5/2018 | Lan | H04W 72/0453 |
| 2019/0334590 A1* | 10/2019 | Son | H04L 5/0048 |
| 2019/0357256 A1* | 11/2019 | Kim | H04W 48/16 |
| 2020/0214036 A1* | 7/2020 | Min | H04W 28/0278 |
| 2020/0326362 A1* | 10/2020 | Guddeti | G01R 23/173 |
| 2022/0217797 A1* | 7/2022 | Kim | H04W 76/15 |

* cited by examiner

FIG. 2
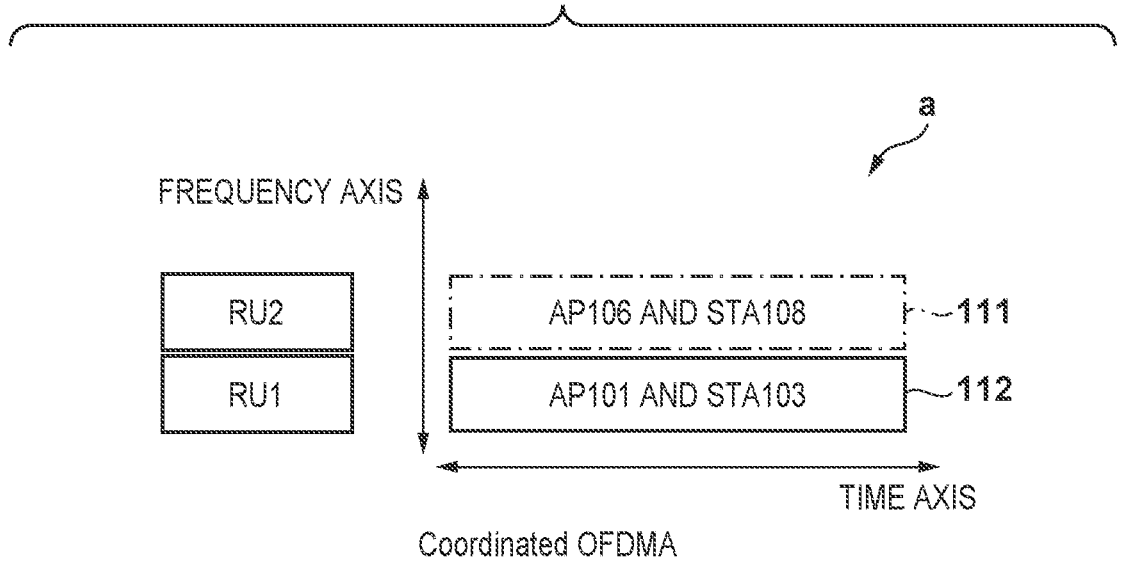
Coordinated OFDMA
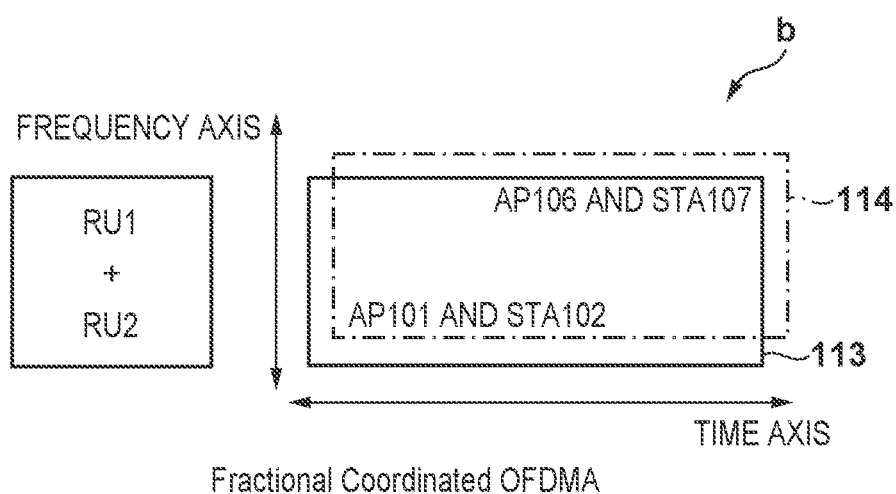
Fractional Coordinated OFDMA

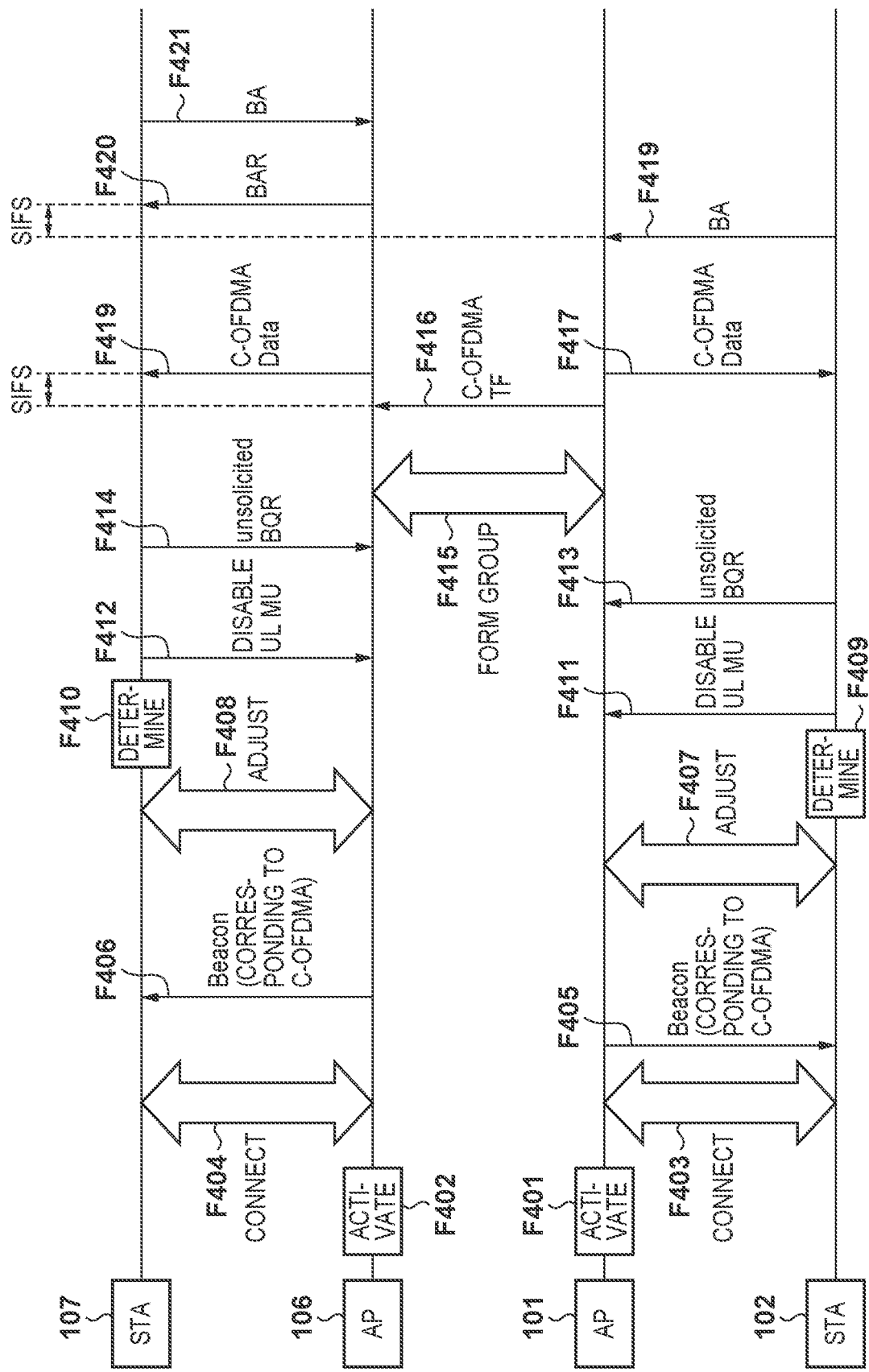

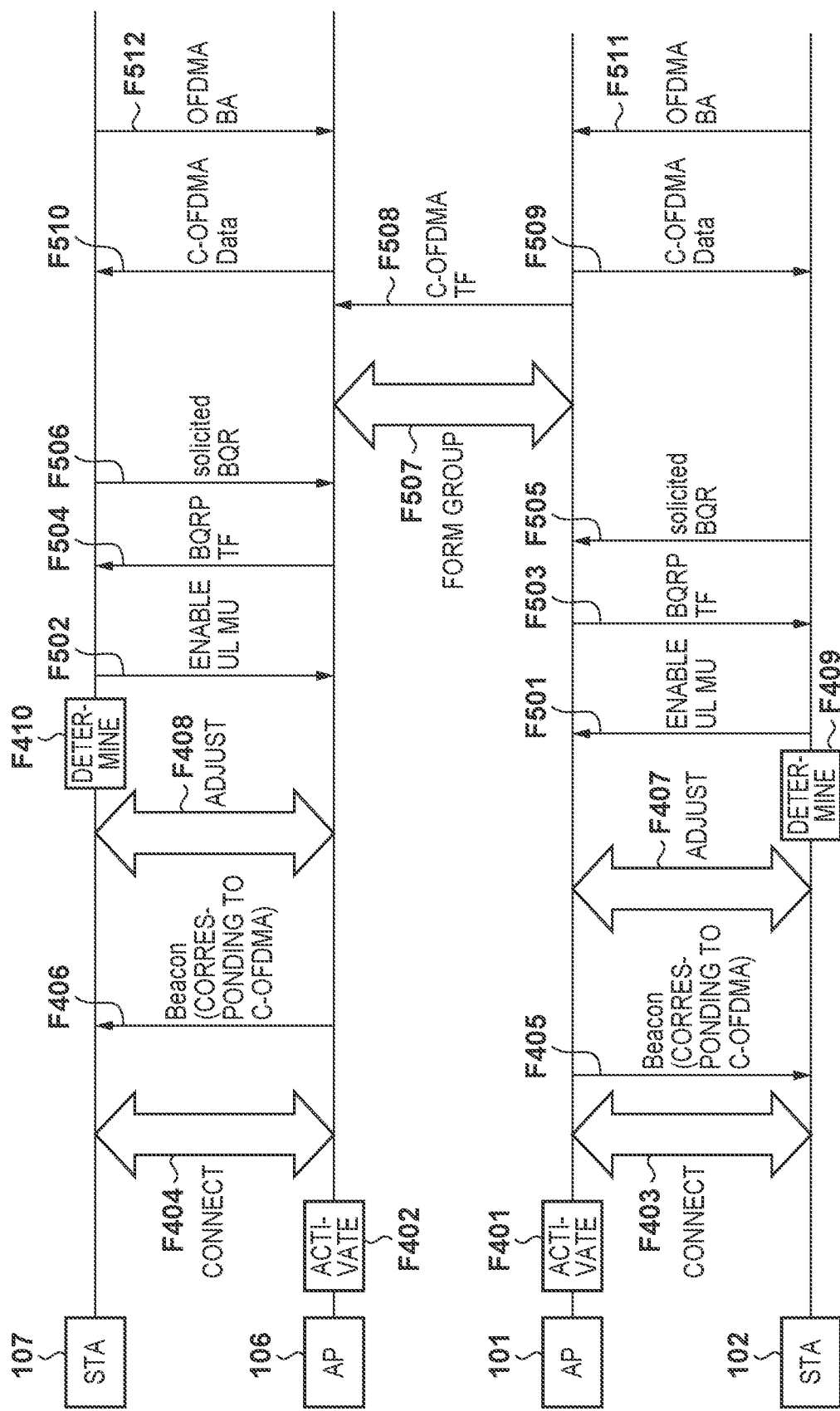

FIG. 8

MAC frame format

| | 801 | 802 | 803 | 804 | 805 | 806 | 807 | 808 | 809 | 810 | 811 |
|---|---|---|---|---|---|---|---|---|---|---|---|
| | Frame Control | Duration/ ID | Address 1 | Address 2 | Address 3 | Sequence Control | Address 4 | QoS Control | HT Control | Frame Body | FCS |
| Octets: | 2 | 2 | 6 | 0 or 6 | 0 or 6 | 0 or 2 | 0 or 6 | 0 or 2 | 0 or 4 | variable | 4 |

801

| | 821 | 822 | 823 | 824 | 825 | 826 | 827 | 828 | 829 | 830 | 831 |
|---|---|---|---|---|---|---|---|---|---|---|---|
| | Protocol Version | Type | Subtype | To DS | From DS | More Fragment | Retry | Power Management | More Data | Protected Frame | +HTC |
| Bits: | 2 | 2 | 4 | 1 | 1 | 1 | 1 | 1 | 1 | 1 | 1 |

PART OF 810

| | 841 | 842 | 843 | 844 | 845 | 846 | 847 |
|---|---|---|---|---|---|---|---|
| | Element ID | Length | Element ID Extension | EHT MAC Capabilities Information | EHT PHY Capabilities Information | Supported EHT-MCS AND NSS Set | PPE Thresholds (optional) |
| Octets: | 1 | 1 | 0 or 1 | 6 | 11 | 4, 8 or 12 | variable |

FIG. 9

HT Control field format (901)

| Variant | B0 | B1 | B2-B29 | B30 | B31 |
|---|---|---|---|---|---|
| HT | 0 | | HT Control Middle | AC Constraint | RDG/MorePPDU |
| VHT | 1 | 0 | VHT Control Middle | AC Constraint | RDG/MorePPDU |
| HE/EHT | 1 | 1 | A-Control | | |

904

A-Control subfield format

| Control List | Padding |
|---|---|
| variable | 0 or more |

Bits: 905

Control subfield format

| Control ID | Control Information |
|---|---|
| 4 | variable |

Bits: 906, 907

Control ID subfield values (908)

| Control ID value | Meaning | Length | Content of the Control Information subfield |
|---|---|---|---|
| 0 | Triggered response scheduling (TRS) | 26 | INFORMATION SIMILAR TO TF |
| 1 | Operating mode (OM) | 12 | bits5 :: UL MU Disable etc. |
| 2 | HE Link adaptation (HLA) | 26 | |
| 3 | Buffer status report (BSR) | 26 | BUFFER AMOUNT FOR EACH ACCESS CATEGORY OF STA |
| 4 | UL power headroom (UPH) | 8 | RELATED TO MARGIN VALUE OF COMMUNICATION POWER LEVEL |
| 5 | Bandwidth query report (BQR) | 10(16) | 20MHz BASE Available Channel Bitmap |
| 6 | Command and status (CAS) | 8 | |
| 7-14 | Reserved | | |
| 15 | Ones need expansion surely (ONES) | 26 | |

COMMUNICATION APPARATUS USING FRAME CONTROL PROCESSING, CONTROL METHOD OF COMMUNICATION APPARATUS, AND NON-TRANSITORY COMPUTER-READABLE STORAGE MEDIUM

CROSS-REFERENCE TO RELATED APPLICATIONS

This application is a Continuation of U.S. patent application Ser. No. 17/318,490 filed on May 12, 2021, which claims the benefit of Japanese Patent Application No. 2020-085495, filed May 14, 2020. The above-identified applications are hereby incorporated by reference herein in their entireties.

BACKGROUND

Field

The present disclosure relates to a communication technique of a wireless LAN.

Description of the Related Art

As a communication standard concerning a wireless LAN (Wireless Local Area Network), an IEEE802.11 series standard is known. The IEEE802.11ax standard implements improvement of a communication speed under a congested situation using OFDMA (Orthogonal Frequency-Division Multiple Access), in addition to high peak throughput.

Presently, to further improve the throughput, the 802.11be TG (Task Group) is working on a standard subsequent to the IEEE802.11ax standard, following a SG (Study Group) called IEEE802.11 EHT (Extreme or Extremely High Throughput). As one of measures for throughput improvement aimed at by the TG, a multi-AP coordination configuration has been examined in which a plurality of APs (access points) coordinate. To efficiently operate the multi-AP coordination configuration, the way the resource of OFDMA is used is adjusted between an AP and a terminal (STA) (US-2019-0288767).

To implement communication by the multi-AP coordination configuration, a plurality of APs need to collect the information of a resource to be used in a coordinated manner. However, the method has not been clarified in the standard. Hence, a collision with communication by another communication apparatus using the same resource may occur, and it may be impossible to efficiently operate communication by multi-AP coordination configuration.

SUMMARY

Various embodiments of the present disclosure provide a technique for efficiently collecting information concerning a communication resource.

According to one embodiment of the present disclosure, there is provided a communication apparatus complying with an IEEE802.11 series standard which includes: a determination unit configured to determine, based on information received from another communication apparatus connected to the communication apparatus, whether UL MU (Uplink Multiuser) communication of the other communication apparatus is enabled or disabled; an acquisition unit configured to acquire, from the other communication apparatus by a method according to a result of the determination, a BQR (Bandwidth Query Report) representing a state of a communication resource usable by the other communication apparatus; and a decision unit configured to decide the communication resource used to communicate with the other communication apparatus based on the acquired BQR.

Further features of the present disclosure will become apparent from the following description of exemplary embodiments (with reference to the attached drawings).

BRIEF DESCRIPTION OF THE DRAWINGS

FIG. 2 is a schematic view for explaining several resource assignment configurations complying with a multi-AP coordination method;

FIG. 4 is a sequence chart of communication processing (in a case in which an STA disables UL MU communication);

FIG. 5 is a sequence chart of communication processing (in a case in which an STA enables UL MU communication);

FIG. 8 shows a MAC frame format;

FIG. 9 shows an HT Control field format; and

DESCRIPTION OF THE EMBODIMENTS

Figure 1:
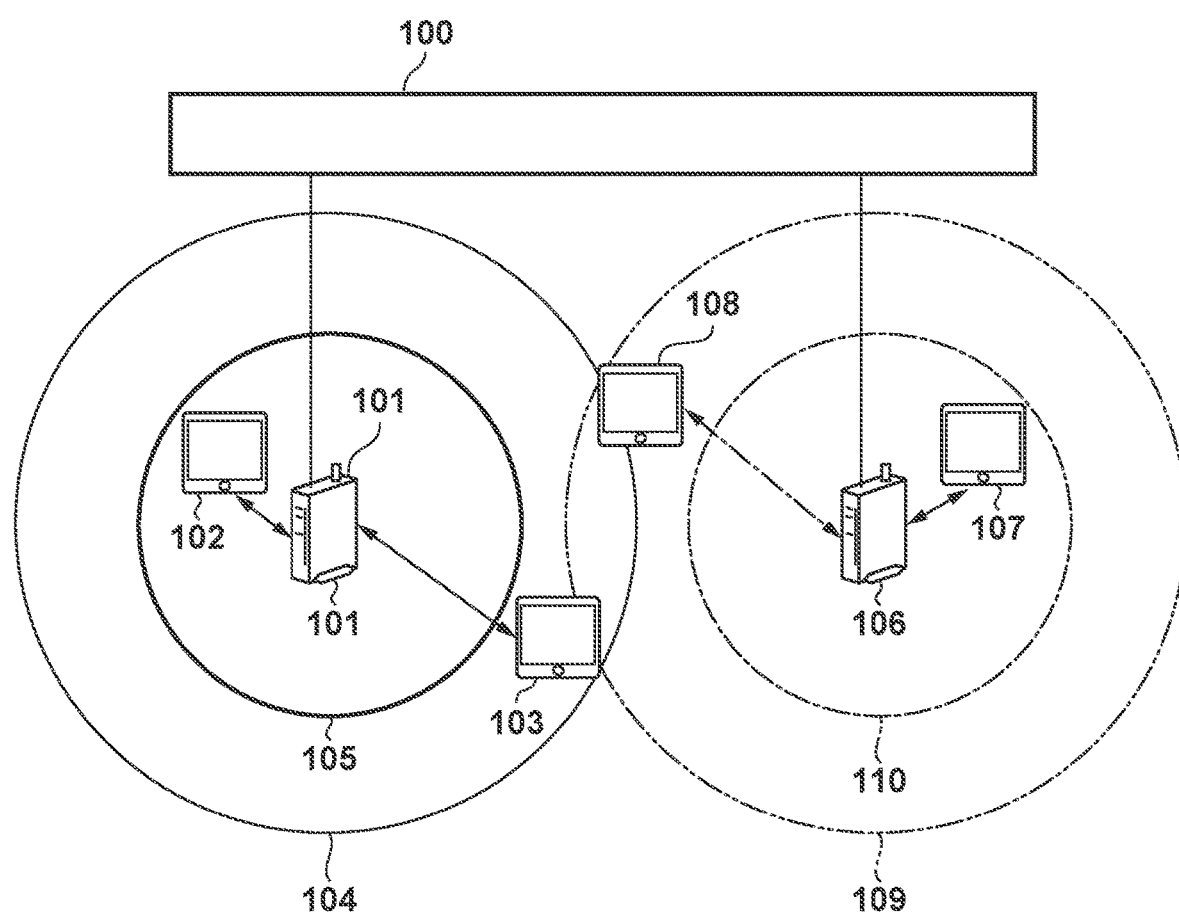
FIG. 1 shows an example of the configuration of a wireless communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

[System Configuration]

FIG. 1 shows an example of the configuration of a wireless communication system according to one embodiment. The network of a BSS (Basic Service Set) 1 (BSS1) managed by an AP (access point) 101 is indicated by a circle 104 of a solid line. The network of a BSS2 managed by an AP 106 is indicated by a circle 109 of an alternate long and two short dashed line. In the BSS1, a range where interference from an AP or STA belonging to another BSS does not exist is indicated by a circle 105 of a thick solid line. In the BSS2, a range where interference from an AP or STA belonging to another BSS does not exist is indicated by a circle 110 of an alternate long and short dashed line.

STAs (stations) 102, 103, 107, and 108 that are wireless LAN terminals can maintain a connection relationship with a plurality of APs. The APs 101 and 106 and the STAs 102, 103, 107, and 108 are communication apparatuses (EHT devices) complying with the IEEE802.11 EHT (Extreme (or Extremely) High Throughput) standard. In addition, the AP 101 and the AP 106 each have a multi-AP coordination configuration function. Here, the multi-AP coordination configuration function is a function capable of implementing high-speed or stable communication with a connected STA (terminal) by coordinating with another AP as compared to a case in only one AP is used. Here, the stable state is a state with an arbitrary combination of an excellent signal-to-noise ratio, low interference, low delay, and low jitter. Various methods are used as techniques of implementing this. The methods are JTX (Joint Transmission) using D-MIMO (Distributed Multiple Input Multiple Output), null steering, Coordinated OFDMA, and Fractional Coordinated OFDMA.

Note that when the multi-AP coordination configuration function is not executed by the AP 101 and the AP 106, the AP 101 manages only the BSS1, and the AP 106 manages only the BSS2. For example, the AP 101 and the AP 106 manage resource assignment in OFDMA communication and the communication timing in the BSS1 and the BSS2, respectively.

A backhaul 100 is a communication means for mutually connecting BSSs and other networks when a plurality of APs that manage the networks of different BSSs constitute a DS (Distributions System). The backhaul 100 may be formed by a wired system such as Ethernet® or a telephone line, or may be formed by a wireless system such as LTE (Long-Term Evolution) or WiMAX (Worldwide Interoperability for Microwave Access). Alternatively, the backhaul 100 may be formed by a wireless LAN of an IEEE802.11 series standard. If the backhaul 100 is formed by such a wireless LAN, it may be the same as or different from a wireless channel used among the APs 101 and 106 and the STAs 102, 103, 107, and 108. Note that although not illustrated, an STA may be connected to the backhaul 100.

Note that the configuration of the wireless communication network shown in FIG. 1 is merely an example for a description. For example, a network including many EHT device and legacy devices (communication apparatuses complying with the IEEE802.11a/b/g/n/ax standard) in a wider area may be formed. In addition, the arrangement of communication apparatuses is not limited to that shown in FIG. 1, and the following argument can be applied to the positional relationship of various communication apparatuses as well. Also, the APs 101 and 106 may be Group Owner of Wi-Fi Direct.

FIG. 2 is a schematic view for explaining several communication resource assignment configurations complying with the multi-AP coordination method, and shows configuration a: Coordinated OFDMA (C-OFDMA), and configuration b: Fractional Coordinated OFDMA (FC-OFDMA). Note that as a notation common to configurations a and b in FIG. 2, the abscissa represents time, and the ordinate represents a frequency. Here, the absolute zone length of the time axis and the granularity/unit of time may change depending on the use case of the multi-AP coordination configuration. For example, a microsecond that is the TU (Time Unit) of IEEE802.11, a millisecond or second associated with the sensitivity or operation of a human, or a numerical value or unit larger than these may be used. The granularity/unit of a frequency axis is, as an example, an RU (Resource Unit) that is the frequency band unit of communication in OFDMA defined by the IEEE802.11ax. However, depending on the capabilities of APs and STAs, the granularity/unit may be changed to a band (frequency band) usable in Multi-band communication or a channel usable in Multi-channel communication. A rectangle of a solid line indicates a time axis/frequency region used by the AP 101 (the network of the BSS1), and a rectangle of an alternate long and short dashed line indicates a time axis/frequency region used by the AP 106 (the network of the BSS2).

Also, to explain a C-OFDMA or FC-OFDMA operation, a concept of "interference limited terminal" is introduced. This is also called an interference limited STA, which is a terminal affected by communication from a BSS to which the terminal itself does not belong. In the network configuration shown in FIG. 1, both the STA 103 and the STA 108 are interference limited terminals (interference limited STAs). To the contrary, a terminal that is not affected by communication from another BSS is called a non-interference limited STA. In the network configuration shown in FIG. 1, both the STA 102 and the STA 107 are non-interference limited terminals (non-interference limited STAs). Note that an interference limited terminal will sometime be referred to as an edge STA, and a non-interference limited terminal will sometime be referred to as a center terminal.

In the C-OFDMA configuration shown by configuration a in FIG. 2, RUs are clearly divided for a plurality of BSSs (APs and STAs). This configuration is used when one or more STAs connected include an interference limited STA (edge terminal). In the network configuration shown in FIG. 1, interference limited STAs are the STAs 103 and 108, and, for example, the RU used by the AP 101 and the STA 103 for communication and that used by the AP 106 and the STA 108 do not overlap.

In the FC-OFDMA configuration shown by configuration b in FIG. 2, the RUs used among the plurality of BSSs (APs and STAs) may partially or wholly overlap. This configuration is for non-interference limited STAs (center terminals). In the network configuration shown in FIG. 1, non-interference limited STAs are the STAs 102 and 107, and the RU used by the AP 101 and the STA 102 for communication and that used by the AP 106 and the STA 107 overlap partially or wholly. Note that in FIG. 2, two rectangles are shifted for the sake of easy understanding, but these may completely overlap. Fractional means that a frequency is not completely divided, that is, a frequency is fractionally used like OFDMA.

[Configuration of Communication Apparatus]

Figure 3A:
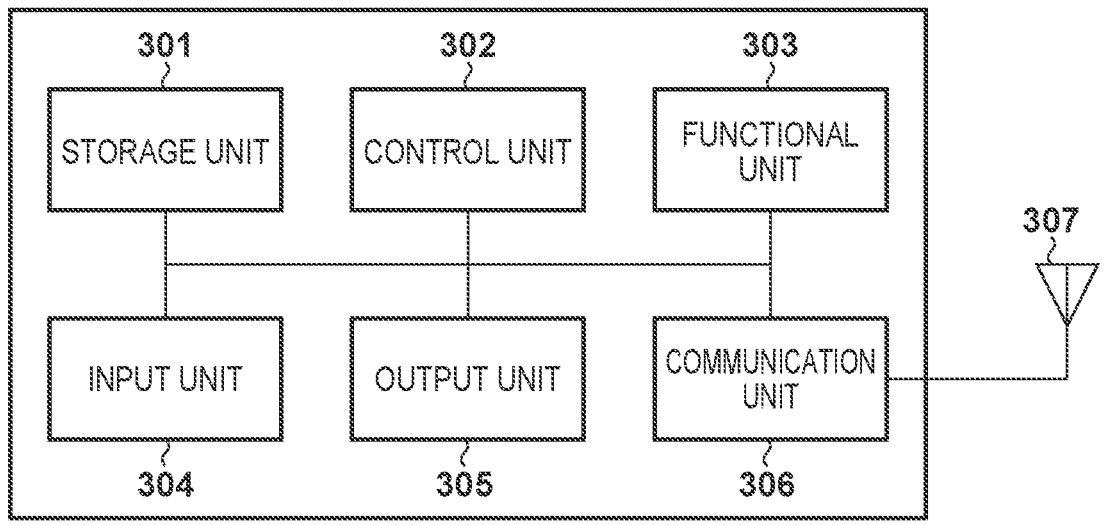
FIG. 3A shows an example of the hardware configuration of a communication apparatus.

FIG. 3A shows an example of a hardware configuration that can commonly be applied to the APs (APs 101 and 106) and the STAs (STAs 102, 103, 107, and 108) that are communication apparatuses according to embodiments of the present invention. As an example of the hardware configuration, the AP (STA) includes a storage unit 301, a control unit 302, a functional unit 303, an input unit 304, an output unit 305, a communication unit 306, and an antenna 307. The storage unit 301 is formed by a memory such as a ROM or a RAM, and stores programs configured to perform various kinds of operations to be described later and various kinds of information such as communication parameters for wireless communication. Note that as the storage unit 301, a storage medium such as a flexible disk, a hard disk, an optical disk, a magneto-optical disk, a CD-ROM, a CD-R, a magnetic tape, a nonvolatile memory card, or a DVD may be used in addition to the memory such as a ROM or a RAM. The storage unit 301 may include a plurality of memories.

The control unit 302 is formed by, for example, at least one of a processor such as a CPU or an MPU, an ASIC (Application Specific Integrated Circuit), a DSP (Digital Signal Processor), an FPGA (Field Programmable Gate Array), and the like. Here, CPU is an acronym for Central Processing Unit, and MPU is an acronym for Micro Processing Unit. The control unit 302 executes a program stored in the storage unit 301, thereby controlling the AP (STA). Note that the control unit 302 may control the AP (STA) by cooperation of a program stored in the storage unit 301 and the OS (Operating System). In addition, the control unit 302 may be formed by a plurality of processors such as a multi-core processor and control the AP (STA). Also, the control unit 302 controls the functional unit 303 and executes predetermined processing such as an AP function (STA function), image capturing, printing, or projection. The functional unit 303 is hardware used by the AP (STA) to execute predetermined processing.

The input unit 304 accepts various kinds of operations from the user. The output unit 305 performs various kinds of outputs to the user. Here, the output by the output unit 305 includes at least one of display on a screen, a voice output by a speaker, and a vibration output. Note that the input unit 304 and the output unit 305 may be implemented by one module like a touch panel.

The communication unit 306 performs control of wireless communication complying with the IEEE 802.11 EHT standard, control of wireless communication complying with Wi-Fi®, and control of IP (Internet Protocol) communication. Also, the communication unit 306 controls the antenna 307, thereby transmitting/receiving radio signals for wireless communication. The antenna 307 is adaptable to multi-AP coordination communication. For example, the AP can perform D-MIMO (Distributed Multiple Input Multiple Output) transmission for JTX (Joint Transmission). In FIG. 3A, only one antenna is shown for the sake of simplicity. However, the antenna may be formed by a plurality of antennas. In general, the number of antennas is a number corresponding to the number of streams. The frequency bands to which the antenna 307 is adaptable can include the 6-GHz band scheduled to be introduced in IEEE802.11ax, in addition to the 2.4-GHz band and the 5-GHz band.

Figure 3B:
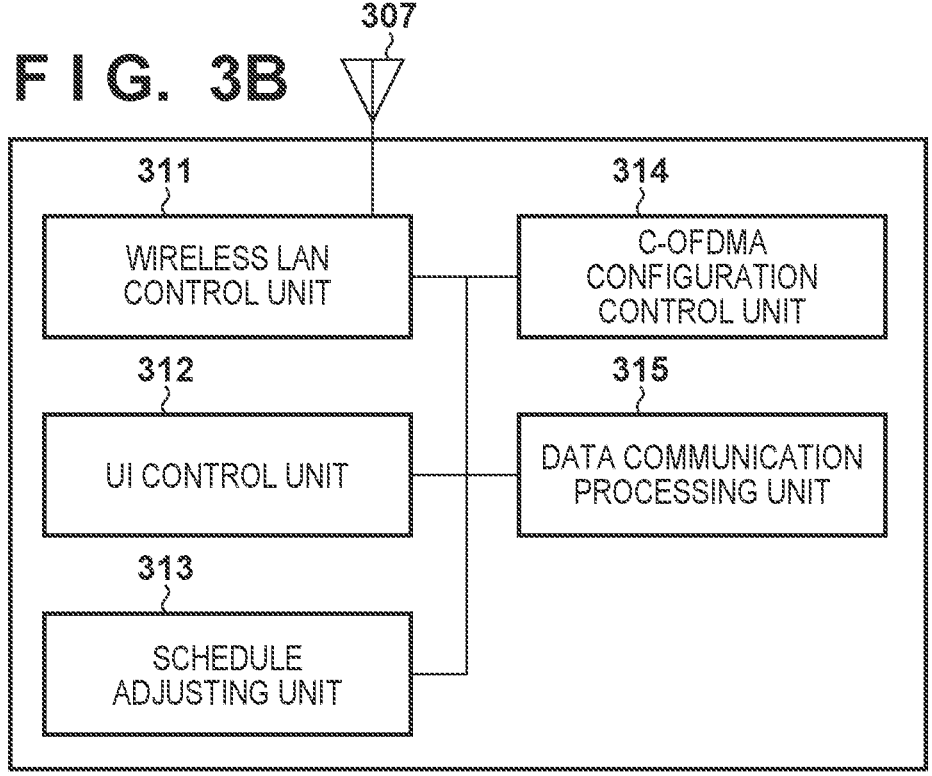
FIG. 3B shows an example of the functional configuration of the communication apparatus.

FIG. 3B shows an example of a functional configuration that can commonly be applied to the APs (APs 101 and 106) and the STAs (STAs 102, 103, 107, and 108) that are communication apparatuses according to embodiments of the present invention. As an example of the functional configuration, the AP (STA) includes a wireless LAN control unit 311, a UI (User Interface) control unit 312, a schedule adjusting unit 313, a C-OFDMA configuration control unit 314, and a data communication processing unit 315.

The wireless LAN control unit 311 is configured to include circuits configured to transmit/receive radio signals to/from other wireless LAN apparatuses (for example, other APs or STAs) via the communication unit 306, and programs configured to control these. The wireless LAN control unit 311 executes communication control for a wireless LAN, such as frame generation, frame transmission, and reception of a radio frame from another wireless LAN apparatus in accordance with the IEEE802.11 standard series. In addition, the wireless LAN control unit 311 has a function of analyzing a received radio frame and determining, based on information included in the radio frame, whether a predetermined condition is satisfied.

The UI (User Interface) control unit 312 accepts an operation on the input unit 304 (FIG. 3A) by the administrator/user (not shown) of the AP (STA) and performs control of transmitting a control signal corresponding to the operation to each constituent element or output (including display and the like) control for the output unit 305 (FIG. 3A). In a state in which the AP (STA) is connected to the STA (AP), the schedule adjusting unit 313 performs control concerning schedule adjustment concerning a C-OFDMA operation to/from the STA (AP) via the communication unit 306. Additionally, the schedule adjusting unit 313 confirms whether the current time matches the timing (schedule) of C-OFDMA communication adjusted with the STA (AP). The C-OFDMA configuration control unit 314 performs communication control for implementing a configuration complying with the above-described C-OFDMA method or FC-OFDMA method via the communication unit 306. The data communication processing unit 315 performs communication processing concerning data transmission/reception via the communication unit 306.

[Procedure of Processing of AP and STA]

FIGS. 4 and 5 are sequence charts of processing according to one embodiment. Here, as one or more STAs, only two STAs, that is, the STA 102 and the STA 107 in the network configuration in FIG. 1 are shown. However, terminals such as the STA 103 and the STA 108 may exist. FIGS. 4 and 5 are different in whether the STA disables or enables UL MU communication, and the method of acquiring a BQR by the AP changes depending on this.

(1) Case in which STA Disables UL MU Communication

FIG. 4 is a sequence chart of processing in a case in which the STA disables UL MU communication. First, in F401, the AP 101 is activated. At this time, the AP 101 decides the C-OFDMA configuration method (operation method) and decides a Coordinator AP and a Coordinated AP. The Coordinator AP is an AP that manages the C-OFDMA operation and transmits a TF (trigger frame) that activates AP coordination communication. In addition, the Coordinated AP is an AP on the managed side, and one or more APs can play the role.

The C-OFDMA configuration method will be described here. The first method is a "static method". In this method, each AP forming C-OFDMA decides the group configuration of the C-OFDMA by device setting (for example, setting by the user) or negotiation. Decision of the Coordinator AP is also performed between the APs. The negotiation and the decision of the Coordinator AP are performed by, for example, exchange of a Public Action frame. The Action frame includes, for example, information representing "participation in the C-OFDMA group" or "decision of the Coordinator AP". Also, the negotiation is performed by, for example, exchange of "Request" and "Response" or exchange of "Indication" and "Confirmation".

The second method is a "dynamic method". In this method, an AP that has acquired an access right to a wireless medium becomes the Coordinator AP. The AP serving as the Coordinator AP notifies APs (Coordinated APs) on the periphery.

The third method is "static method+dynamic method". In this method, the group of the AP and the STA, which participate in the C-OFDMA, is decided by the static method, and the Coordinator AP is decided by the dynamic method.

In this embodiment, the C-OFDMA configuration method is the static method (F415 to be described later). After the activation of the AP 101 in F401, in F402, the AP 106 is activated. In F403, the AP 101 executes a connection procedure of the IEEE802.11 standard with respect to the STA 102. In this connection procedure, they can exchange each other's capability information and operation information by an IE (Information Element) included in a Management frame of a MAC (Medium Access Control) frame. The IE is newly defined in correspondence with the progress of IEEE802.11 standardization. For example, an HT Capability element is used in IEEE802.11n, and a VHT Capability element is used in IEEE802.11ac. In addition, an HE Capabilities element is used in IEEE802.11ax, and an EHT Capabilities element is used in IEEE802.11be. Note that the Management frame is a Beacon, Probe Request/Response, Association Request/Response, or Authentication Request/Response frame.

FIG. 8 shows an example of the configuration of the MAC frame of the IEEE802.11 standard and the IE (information element) that is one element of the Frame Body of the MAC frame (MAC frame format). The frame configuration shown in FIG. 8 is a frame configuration adaptable to IEEE802.11be.

In a MAC frame 800, a Frame Control field 801 is formed by subfields 821 to 831. In each of Address fields 803, 804, 805, and 807, addresses such as a BSSID, a transmission source, and a destination are set depending on the type of the MAC frame (Type subfield 822). An HT Control field 809 will be described later with reference to FIG. 9. A part of a Frame Body field 810 is represented by subfields 841 to 847. A detailed description of a Duration/ID field 802, a Sequence Control field 806, a QoS Control field 808, and an FCS (Frame Check Sequence) field 811 will be omitted.

In the Frame Control field 801, the Protocol Version subfield 821 includes two bits representing a Protocol Version, and is "0" in a frame complying with the IEEE802.11 standard. The Type subfield 822 includes two bits representing a frame type (Management, Control, or Data). The Subtype subfield 823 is configured to more finely classify the frame type (Management, Control, or Data). The To DS subfield 824 represents that the destination of the frame is a DS (Distribution System). The From DS subfield 825 includes a bit representing From DS. A detailed description of the More Fragment subfield 826, the Retry subfield 827, the Power Management subfield 828, the More Data subfield 829, the Protected Frame subfield 830, and the +HTC subfield 831 will be omitted.

The subfields 841 to 847 in the Frame Body field 810 represent the configuration of the IE (information element) and, more particularly, the configuration of the EHT Capabilities element. Concerning the EHT of IEEE802.11be, the value of the Element ID subfield 841 follows the value of the HE Capabilities element of IEEE802.11ax and is set to 255. The Length subfield 842 represents the length of the information element. In the Element ID Extension subfield 843, an EHT Capabilities element concerning capability information and an EHT Operation element concerning operation information are newly defined.

The configurations of the MAC Capabilities Information subfield 844, the PHY Capabilities Information subfield 845, the Supported EHT-MCS And NSS Set subfield 846, and the PPE (Physical layer Packet Extension) Thresholds subfield 847 are the same as in IEEE802.11ax. In this embodiment, however, a subfield representing the presence/absence of a C-OFDMA capability, a subfield representing the presence/absence of support for an operation using a BQR (Bandwidth Query Report), and a subfield representing the presence/absence of support for a UL MU (UpLink Multi User) communication function can be defined in the EHT MAC Capabilities Information subfield 844. Note that the UL MU communication function is a function of transmitting data from a plurality of STAs (terminals) in the AP direction in accordance with a TF (trigger frame) from an AP. The BQR is information representing the validity of an operating channel of a BSS with which a STA is associated for every 20-MHz band. In the EHT MAC Capabilities Information subfield 844, if, for example, a BQR Support subfield is defined as a subfield representing the presence/absence of support for the operation using the BQR, the AP sets the bit to "1", thereby representing that the BQR from the STA can be received (support for the operation using the BQR is present). In addition, the STA sets the bit to, for example, "1", thereby representing that it is possible to generate a BQR and notify the AP of it.

FIG. 9 shows the format of the HT Control field 809 in FIG. 8 (HT Control). The length of this field is 32 bits. A Variant 901 represents a type according to the progress of IEEE802.11 standardization. A B0 902 and a B1 903 are two bits used to decide the type. In the example shown in FIG. 9, an HE (High Efficiency: 802.11ax) and an EHT (Extremely High Throughput: 802.11be) use the same two bits=11 (B0=1, and B1=1). An A-Control field 804 includes 30 bits, and includes a Control List subfield 905 and a Padding subfield 906. The Control List subfield 905 further includes a Control ID subfield 907 and a Control Information subfield 908. The Control ID subfield 907 represents the type of the Control List subfield 905, and the Control Information subfield 908 includes the contents of the Control ID subfield 907 (a table on the lower side of FIG. 9). Here, a subfield representing the OM (Operational Mode) of the Control ID subfield 907=1 is used to change the operation state of the STA. In the subfield, for example, a value representing a UL MU disabled/enabled state or a BQR disabled/enabled state is set.

Referring back to FIG. 4, in F403, the AP 101 sets an Association ID of the STA 102. This ID is used as an STAID to identify each STA in a TF (trigger frame) to be described later.

In F404, the AP 106 executes the connection procedure of the IEEE802.11 standard with respect to the STA 107 in accordance with the same procedure as in F403. In F405, the AP 101 broadcasts a Beacon frame of the IEEE802.11 standard. The AP 101 includes, in the Beacon frame, the C-OFDMA capability of the AP 101 and information representing an operation disabled/enabled state. In F406, the AP 106 transmits a Beacon frame. As in F405, the Beacon frame includes the C-OFDMA capability of the AP 106 and information representing an operation disabled/enabled state.

In F407, the AP 101 and the STA 102 perform schedule adjustment concerning the C-OFDMA operation. As an example of the adjusting method, the STA 102 applies (requests) to the AP for the schedule of the C-OFDMA operation (including a timing at which the C-OFDMA operation is possible), and the AP responds to the application (request). As the types of the response, "directly accept a schedule from the STA", "propose a different schedule", "reject", and the like exist. When the STA 102 returns "confirmation" to the response, the AP 101 and the STA 102 can share a timing at which they can operate by C-OFDMA or a timing at which the operation is impossible. In F408, the same processing as in F407 is performed between the AP 106 and the STA 107. Communication in F407 and F408 is performed by, for example, a new frame in the Public Action frame of the MAC frame complying with the IEEE802.11 series standard and exchanging the new frame.

In F409, the STA 102 determines whether "it is the timing of the C-OFDMA operation", and also determines whether to "enable UL MU (Uplink Multiuser) communication". In the sequence shown in FIG. 4, the STA 102 determines to "disable UL MU communication". In F410, the STA 107 performs determination processing similar to F409, and determines to "disable UL MU communication".

In F411, the STA 102 transmits a frame representing the UL MU disabled state to the AP 101. For example, in the HT Control field 809 (FIG. 9) included in the MAC frame (FIG.

7), the value of the subfield representing the OM (Operational Mode) of the Control ID subfield 907=1 is set to a value representing the UL MU disabled state (for example, "1" in a predetermined bit). The subfield representing the OM is used to change the operation state of the STA, as described above. Upon receiving the frame representing the UL MU disabled state, the AP 101 waits for reception of a BQR (Bandwidth Query Report) from the STA 102. In F412, the STA 107 transmits a frame representing the UL MU disabled state to the AP 106, as in F411. Upon receiving the frame representing the UL MU disabled state, the AP 106 waits for reception of a BQR from the STA 107.

In F413, the STA 102 transmits an unsolicited BQR to the AP 101. Here, unsolicited means that the STA performs the process at the discretion of the STA itself without a request from the AP. In F414, the STA 107 transmits an unsolicited BQR to the AP 106. The BQR is included as the subfield of the Control ID subfield 907=5 in the HT Control field 809 (FIG. 9) included in the MAC frame (FIG. 8). The structure of the BQR is introduced from the IEEE802.11ax standard, and the length of the Control Information subfield 908 is 10 bits. Eight bits of these bits are used to represent the validity of a channel (communication resource) for every 20-MHz band within the operating channel range of 160 MHz. The validity is a value based on an ED-based CCA (clear channel assessment at the energy level), represents "idle" by "1" and "busy" by "0". An LSB indicates a lower frequency side, and an MSB indicates a higher frequency side. Note that a 320-MHz operation has newly been examined in IEEE802.11be. In this case, the length is expanded and expressed by 16 bits.

Also, in the processing of F412 and F413, the STA 102 and the STA 107 may transmit supplementary information of the BQR. If the channel state for every 20-MHz is "busy", the supplementary information represents the information of a BSS that uses the channel, that is, "correspondence between a BSSID and a channel". This information can also be communicated by a new Action frame or an IEEE802.11 data frame.

In F415, the AP 101 and the AP 106 execute a group forming procedure for the C-OFDMA operation. In this procedure, the AP 101 and the AP 106 mutually confirm whether "the C-OFDMA operation is possible with the connected STA". Also, the AP 101 and the AP 106 determine whether the STA 102 and the STA 107 are center terminals or edge terminals. As one method of determining whether an STA is an edge terminal, if the existence of another BSS is recognized by scan of an STA when the existence of the other BSS cannot be recognized by scan of an AP itself, it is determined that the STA is an edge terminal. Here, the other BSS indicates a BSS managed by an AP that performs the C-OFDMA operation with an AP.

In F415, if a BSSID is already acquired from a connected STA, the AP 101 or the AP 106 may determine whether the BSSID and the BSSID of the AP are identical. If the BSSIDs are different, the AP 101 or the AP 106 may determine that a BSS that cannot coordinate with the BSS of itself exists, and perform not the C-OFDMA operation but processing of changing the operating channel.

In F415, the AP 101 and the AP 106 decide the Coordinator AP. As described above, in this embodiment, the static method is used as the C-OFDMA configuration method (operation method), and in the example shown in FIG. 4, the following description will be made assuming that the AP 101 is the Coordinator AP. The AP 101 serving as the Coordinator AP acquires the result of determining whether the STA 102 and the STA 107 are center terminals or edge terminals.

In F415, the AP 101 and the AP 106 each also decide a policy (ACK policy) representing a method of returning an ACK (acknowledgement) of DL data transmission to the STA 102 and the STA 107. For example, the AP 101 and the AP 106 can designate "immediate" to the ACK policy of DL data to be transmitted. When "immediate" is designated to the ACK policy, the STA of the transmission destination can be caused to transmit a BA after the elapse of SIFS.

Figure 10:
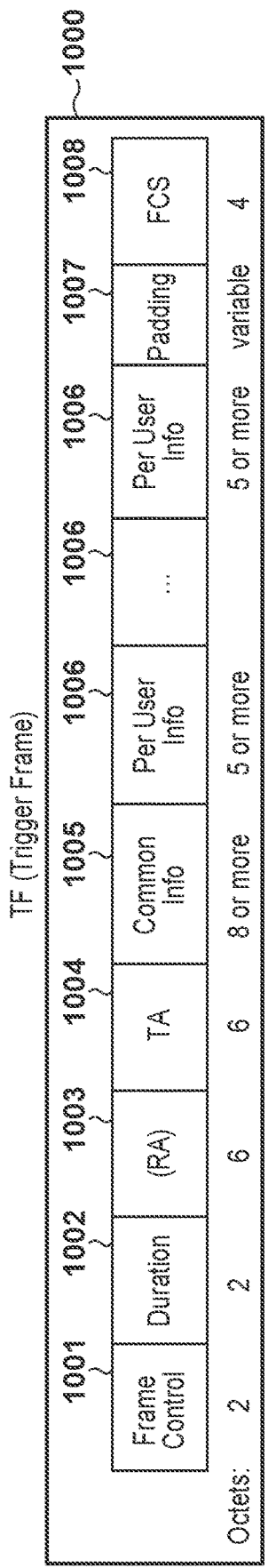
FIG. 10 shows the configuration of a TF (Trigger Frame).

In F416, the AP 101 decides the assignment of the resource based on the result of determining whether the STA 102 and the STA 107 are center terminals or edge terminals. The assignment of the resource is as shown by configuration a and configuration b in FIG. 2. Since both the STA 102 and the STA 107 are center terminals, a resource assignment configuration like configuration b in FIG. 2 is obtained. After the decision of the resource assignment, the AP 101 transmits a C-OFDMA TF to the AP 106. The TF is a TF transmitted to the AP 106 to perform DL (Downlink) transmission in F417 and F418 synchronously by the AP 101 and the AP 106 and is a new TF. This TF includes the information of the resource assignment decided in F416, the terminating time of C-OFDMA transmission, and the like. The format of the TF is similar to that of a TF of IEEE802.11ax shown in FIG. 10. In this frame, the value of a Trigger Type subfield 1011 in FIG. 10 is 8.

In F417, the AP 101 performs DL data transmission (transmission of a data frame) by C-OFDMA to the STA 102. In F418, the AP 106 performs DL data transmission by C-OFDMA to the STA 107. The AP 101 and the AP 106 perform synchronous control such that the transmission in F417 and F418 is performed at a timing after SIFS (Short InterFrame Space) from F416. In F417 and F418, the AP 101 and the AP 106 perform DL data transmission using the resource according to the resource assignment decided in F416.

In F419, the STA 102 that has received the data returns a BA (Block ACK). Here, in F420, the AP 106 transmits a BAR (Block ACK Request) to the STA 107, and in F421, the STA 107 that has received the BAR returns a BA. The procedure from F419 to F421 complies with the ACK policy decided in F415. In the example shown in FIG. 4, the AP 101 designates "immediate" to the ACK policy of DL data in F417. For this reason, the STA 102 transmits the BA after the elapse of SIFS from DL data reception in F417. On the other hand, the AP 106 designates use of BAR to the ACK policy of the DL data in F418. Note that FIG. 4 is merely an example, and the processing of F419 and that of F420 and F421 may be reversed.

In addition, since both the STA 102 and the STA 107 are center terminals, the AP 106 may not transmit a BAR in F420, and the STA 107 may transmit the BA that should be transmitted in F421 at the same timing as F419. This is because they do not interfere with each other even if the BA uses a frequency of 20 MHz. However, if another STA (terminal) exists in each BSS, the procedure of BAR and BA as shown in FIG. 4 is used.

(2) Case in which STA Enables UL MU Communication

FIG. 5 is a sequence chart of processing in a case in which the STA enables UL MU communication. Processing of F401 to F410 is similar to FIG. 4. In this embodiment, however, in the determination of F409 and F410, the STA 102 and the STA 107 determine to "enable UL MU communication".

In F501, the STA 102 transmits a frame representing a UL MU enabled state to the AP 101. For example, in the HT Control field 809 (FIG. 8) included in the MAC frame (FIG. 7), the value of the subfield representing the OM (Operational Mode) of the Control ID subfield 907=1 is set to a value representing the UL MU enabled state (for example, "0" in a predetermined bit). In F502, the STA 107 transmits a frame representing the UL MU enabled state to the AP 106, as in F501.

In F503, the AP 101 transmits a BQRP TF. In F504, the AP 106 transmits a BQRP TF. In F505, the STA 102 transmits a solicited BQR to the AP 101. Solicited means that the STA complies with a request from the AP, as described above. In F506, the STA 107 transmits a solicited BQR to the AP 106.

In F507, the AP 101 and the AP 106 execute a group forming procedure for the C-OFDMA operation. This procedure is similar to the procedure of F415 in FIG. 4. In F508, the AP 101 decides the assignment of the resource based on the result of determining whether the STA 102 and the STA 107 are center terminals or edge terminals. After the decision of the resource assignment, the AP 101 transmits a C-OFDMA TF to the AP 106. The processing of F507 is similar to F416 in FIG. 4.

In F509, the AP 101 performs DL data transmission (transmission of a data frame) by C-OFDMA to the STA 102. The AP 101 includes, in the data transmission, the format (ACK policy) of a response to the STA and the information of the assigned resource to be used. In F510, the AP 106 performs DL transmission by C-OFDMA to the STA 107. In F511, the STA 102 returns an OFDMA BA to the AP 101. In F512, the STA 107 returns an OFDMA BA to the AP 106.

[Operation of AP]

Figure 6A:
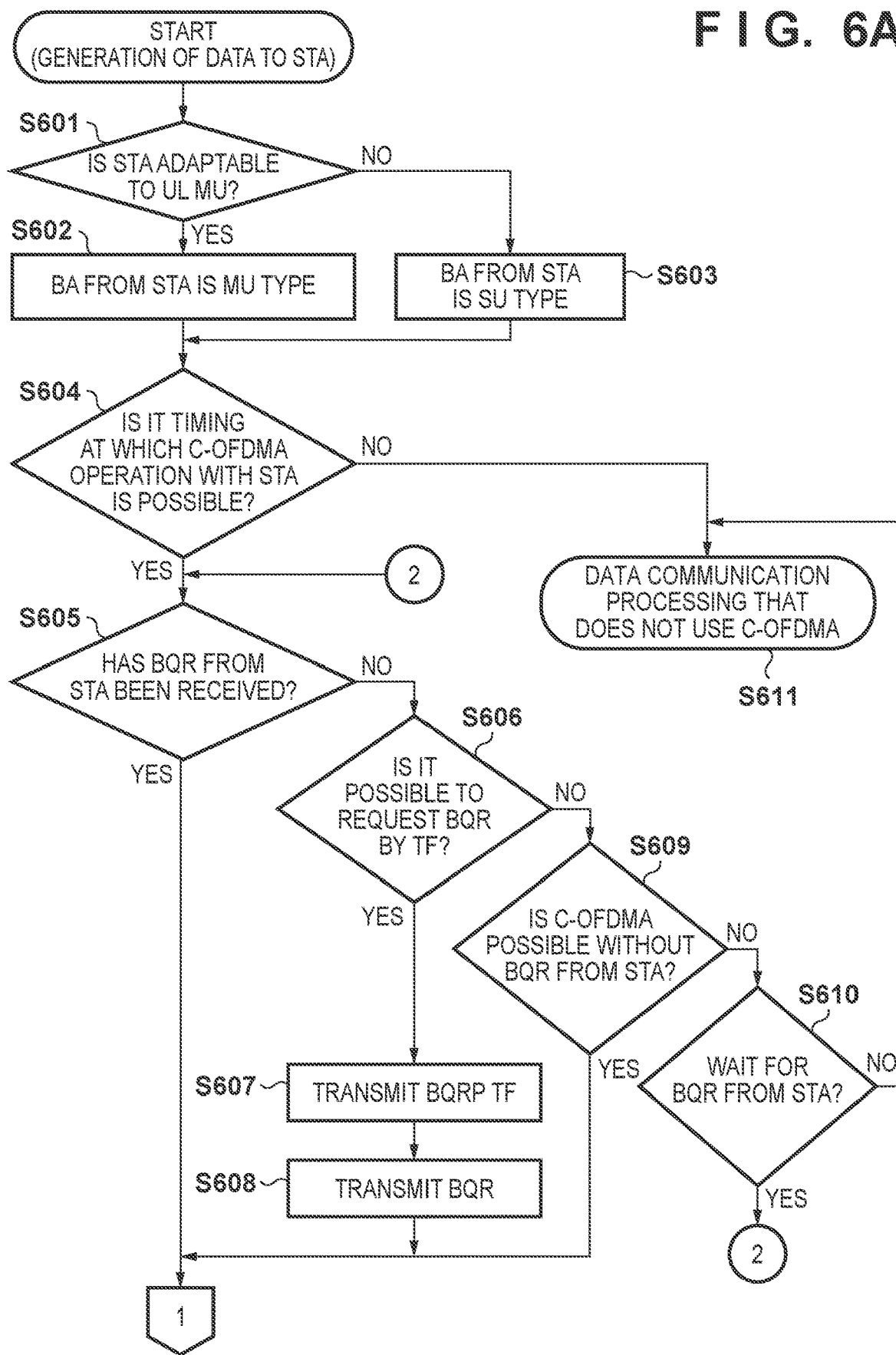
FIG. 6A is a flowchart (1) of processing executed by an AP.
Figure 6B:
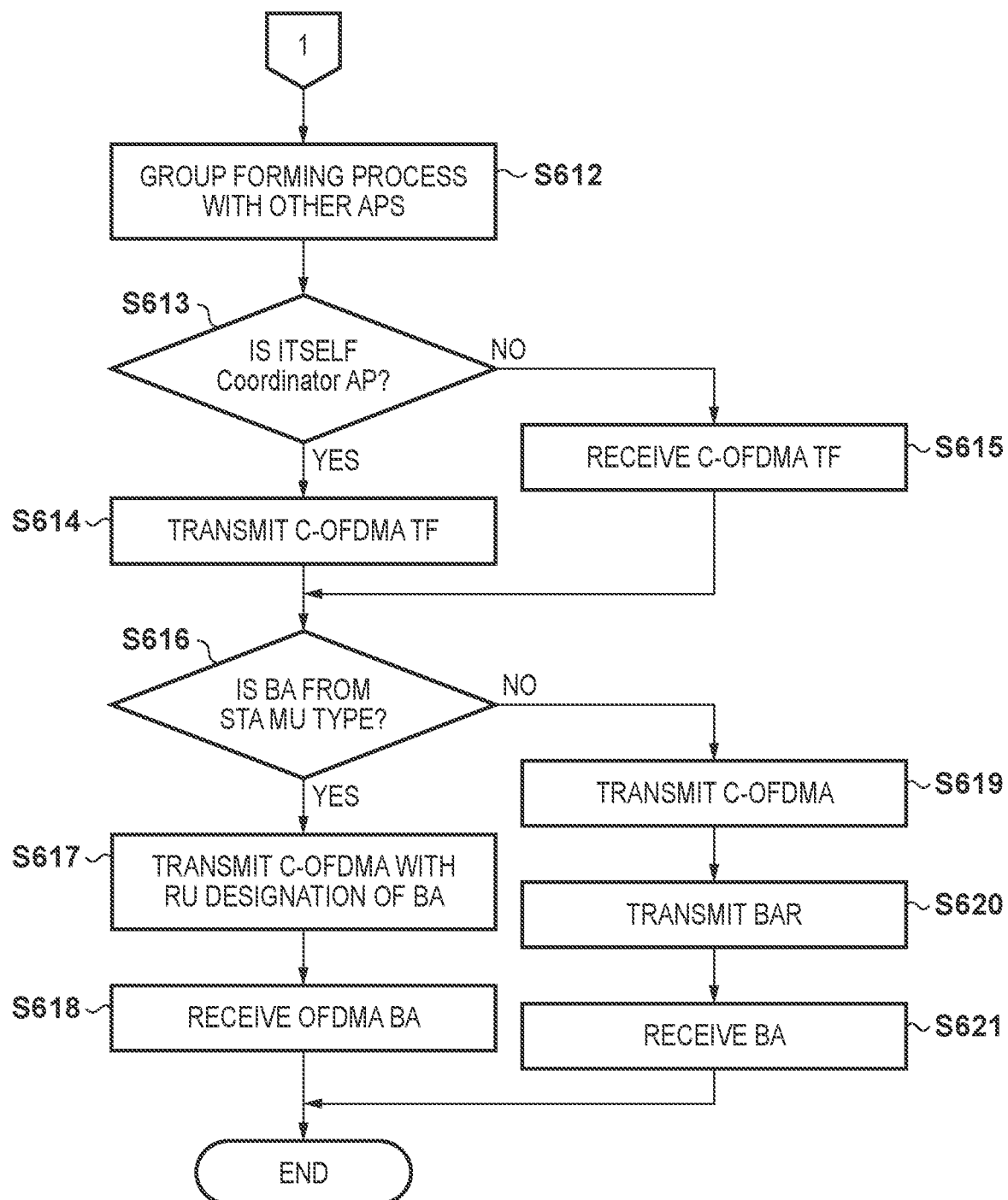
FIG. 6B is a flowchart (2) of processing executed by an AP.

The operation of the AP 101 will be described next with reference to FIGS. 6A and 6B. FIGS. 6A and 6B are flowcharts of processing executed by the AP 101. This processing is executed by the AP 101 when data to be transmitted from an STA (to be simply referred to as an STA in the description of FIGS. 6A and 6B) connected to the AP itself to another STA is generated. Assume that processing (schedule adjustment concerning the C-OFDMA operation) corresponding to F407 in FIG. 4 is already executed. The flowcharts shown in FIGS. 6A and 6B can be implemented when the control unit 302 of the AP 101 executes a control program stored in the storage unit 301 and executes calculation and processing of information and control of each piece of hardware.

In step S601, the wireless LAN control unit 311 analyzes a frame received via the communication unit 306 in the processing of F403 or F411 of FIG. 4 and confirms whether the STA is adaptable to UL MU (Up Link Multi User) communication. More specifically, the wireless LAN control unit 311 analyzes the received frame, and confirms the MAC Capabilities Information subfield 844 and the HT Control field 809. "Adaptable to UL MU communication" represents, for example, a state in which the MAC Capabilities Information subfield 844 indicates "presence of C-OFDMA capability", and the OM of the Control ID subfield 907=1 does not indicate "UL MU disabled" in the HT Control field 809 (a state in which "UL MU enabled" is indicated). Otherwise, the wireless LAN control unit 311 determines that the STA is not adaptable to UL MU communication.

If the STA is adaptable to UL MU communication (YES in step S601), the process advances to step S602. If the STA is not adaptable to UL MU communication (NO in step S601), the process advances to step S603. In step S602, the wireless LAN control unit 311 decides to receive the BA (Block Ack) from the STA in the MU format, and holds information representing the decision in the storage unit 301. In step S603, the wireless LAN control unit 311 decides to receive the BA (Block Ack) from the STA in the SU (Single User) format, and holds information representing the decision in the storage unit 301. In step S604, the schedule adjusting unit 313 determines whether it is a timing at which the C-OFDMA operation with the STA is possible. As one of determination methods, the schedule adjusting unit 313 confirms whether the current time matches the schedule of the C-OFDMA operation adjusted with the STA.

If it is a timing at which C-OFDMA communication is possible (YES in step S604), the process advances to step S605. In step S605, the wireless LAN control unit 311 confirms whether a BQR (Bandwidth Query Report) from the STA is already received. If the BQR is already received (YES in step S605), the process advances to step S612. If the BQR is not already received (NO in step S605), the process advances to step S606. In step S606, the wireless LAN control unit 311 determines whether it is possible to request the STA to transmit a BQR by a TF (trigger frame). This determination is done by analyzing the frame received by the processing of F403 in FIG. 4 and confirming whether the STA is adaptable to the BQR by the wireless LAN control unit 311. More specifically, the wireless LAN control unit 311 analyzes the received frame and confirms the MAC Capabilities Information subfield 844 and the HT Control field 809. "Adaptable to the BQR" represents, for example, a state in which the MAC Capabilities Information subfield 844 indicates "presence of support for an operation using a BQR", and the OM of the Control ID subfield 907=1 does not indicate "BQR disabled" in the HT Control field 809 (a state in which "BQR enabled" is indicated). Otherwise, the wireless LAN control unit 311 determines that the STA is not adaptable to the BQR.

If it is possible to request the STA to transmit a BQR (YES in step S606), the process advances to step S607. If it is possible to request (NO in step S606), the process advances to step S609. In step S607, the wireless LAN control unit 311 transmits a BQRP (Bandwidth Query Report Poll) TF. Next, in step S608, the wireless LAN control unit 311 waits for reception of a BQR from the STA, and if a BQR is received, the process advances to step S612. In step S609, the C-OFDMA configuration control unit 314 determines whether execution of the C-OFDMA function is possible in a state in which the BQR from the STA is not received. For example, if the AP 101 can confirm a free resource by scanning a wireless medium by the AP 101 itself or scanning by another AP, the C-OFDMA configuration control unit 314 can determine that execution of the C-OFDMA function is possible. Also, for example, the C-OFDMA configuration control unit 314 may be configured to determine that execution of the C-OFDMA function is possible by setting by the administrator of the AP 101 via the UI control unit 312.

If execution of the C-OFDMA function is possible (YES in step S609), the process advances to step S612. If execution of the C-OFDMA function is not possible (NO in step S609), the process advances to step S610. In step S610, the wireless LAN control unit 311 determines whether to wait for a BQR from the STA. To wait for a BQR from the STA (YES in step S610), the process returns to step S605. To not wait for a BQR from the STA (NO in step S610), the AP 101 gives up execution of the C-OFDMA function including the connected STA, and the process advances to step S611. Here, the case in which a BQR from the STA is not waited is, for example, a case in which a predetermined time has elapsed after generation of data to be transmitted to another STA when starting the processing of step S601.

In step S611, the data communication processing unit 315 determines that communication with the STA by C-OFDMA cannot be executed at the current timing, and performs communication without coordinating with another AP (AP 106). The processing of step S611 is processing that can be performed even in a case in which it is determined in step S604 that it is not a timing at which C-OFDMA communication is possible. Note that processing after step S611 does not include control characteristic to various embodiments of the present invention, and a description thereof will be omitted.

In step S612, the C-OFDMA configuration control unit 314 performs group forming processing for C-OFDMA with another AP (AP 106). This processing is similar to the processing of F415 in FIG. 4. In step S613, the C-OFDMA configuration control unit 314 determines whether the AP itself has become a Coordinator AP or a Coordinated AP. If the AP is a Coordinator AP (YES in step S613), the process advances to step S614. If the AP is a Coordinated AP (NO in step S613), the process advances to step S615. In step S614, the C-OFDMA configuration control unit 314 transmits a C-OFDMA TF. In step S615, the C-OFDMA configuration control unit 314 receives a C-OFDMA TF.

In step S616, the data communication processing unit 315 confirms, based on the information stored in the storage unit 301 by the processing in step S602 or S603, whether a BA (Block ACK) from the STA has the MU (Multi User) format. If the BA has the MU format (YES in step S616), the process advances to step S617. If the BA has the SU (Single User) format (NO in step S616), the process advances to step S619.

In step S617, the data communication processing unit 315 transmits data including an RU (Resource Unit) designation of the BA to the STA. In step S618, the data communication processing unit 315 receives an OFDMA BA from the STA.

In step S619, the data communication processing unit 315 transmits data by C-OFDMA. Information representing that the ACK policy is "by BAR (Block ACK Request)" is added to this data. In step S620, the data communication processing unit 315 transmits a BAR to the STA. In step S621, the data communication processing unit 315 receives a BAR from the STA.

The series of C-OFDMA communication processes ends here. After that, if generation of data to the STA is further recognized, the AP 101 repeats the processing from step S600.

Note that FIGS. 6A and 6B explain a case in which one STA is connected to one AP (AP 101). However, a plurality of STAs (terminals) may be connected to the AP. Not only DL (Down Link) data communication from the AP to the STA but also UP (Up Link) data communication from each STA to the AP can be controlled similarly. In this case, communication of a TF (see FIG. 9) from the AP, UL MU data from each STA, and a Multi-STA BA from the AP is performed.

[Operation of STA]

Figure 7:
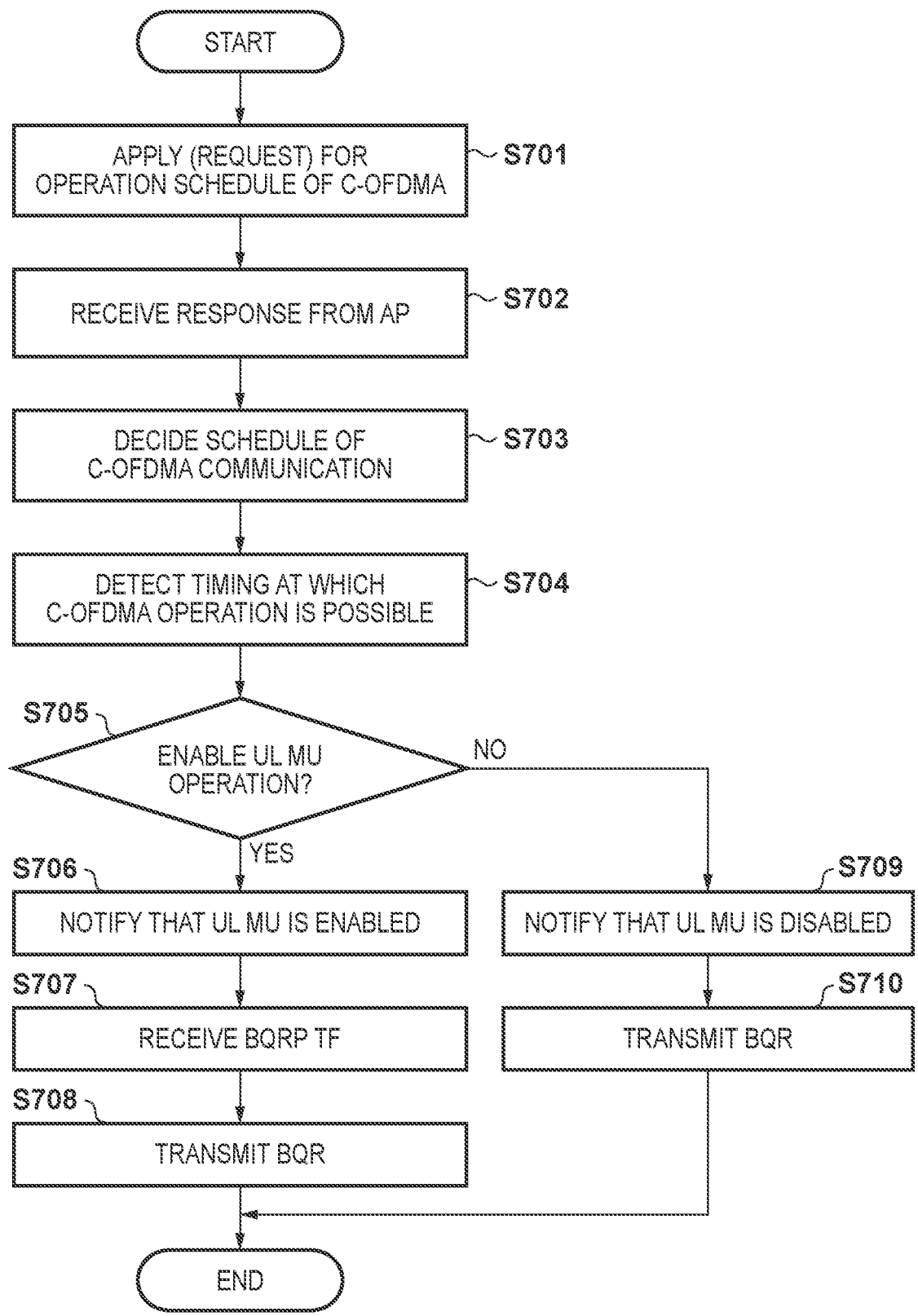
FIG. 7 is a flowchart of processing executed by an STA.

The operation of the STA will be described next with reference to FIG. 7. FIG. 7 is a flowchart of processing executed by the STA 102. Note that although the description of FIG. 7 will be made concerning the STA 102, a similar description can be applied to the STA 103 and the STAs 107 and 108 for the AP 106. The flowchart shown in FIG. 7 can be implemented when the control unit 302 of the STA 102 executes a control program stored in the storage unit 301 and executes calculation and processing of information and control of each piece of hardware.

In step S701, the C-OFDMA configuration control unit 314 applies (requests) for the operation schedule of C-OFDMA. This processing corresponds to F407 in FIG. 4.

In step S702, the C-OFDMA configuration control unit 314 receives a response from the AP 101. In step S703, the schedule adjusting unit 313 decides the schedule of the C-OFDMA operation with the AP 101. This processing corresponds to F407 in FIG. 4. In step S704, the schedule adjusting unit 313 detects a timing at which the C-OFDMA operation with the AP 101 is possible. As one of detection methods, the schedule adjusting unit 313 confirms whether the current time matches the schedule of the C-OFDMA operation adjusted with the AP 101.

In step S705, the control unit 302 determines whether to enable the UL MU operation. For example, the control unit 302 determines whether to enable the UL MU operation based on setting by the user of the STA 102 via the UI control unit 312, setting in the system, the number of connectable STAs in one or more BSSs, and the like. To enable the UL MU operation (YES in step S705), the process advances to step S706. To disable the UL MU operation (NO in step S705), the process advances to step S710.

In step S706, the wireless LAN control unit 311 transmits a notification of the UL MU enabled state to the AP 101. Note that if the STA 102 has already notified the AP 101 of the UL MU enabled state, this processing may be omitted. In step S707, the wireless LAN control unit 311 receives a BQRP TF from the AP 101. Next, in step S708, the wireless LAN control unit 311 transmits a solicited BQRtotheAP 101.

In step S709, the wireless LAN control unit 311 transmits a notification of the UL MU disabled state to the AP 101. Note that if the STA 102 has already notified the AP 101 of the UL MU disabled state, this processing may be omitted. Next, in step S710, the wireless LAN control unit 311 transmits an unsolicited BQRtotheAP 101.

[Configuration of Trigger Frame]

FIG. 10 shows the configuration of a TF (Trigger Frame). The TF is a frame introduced from IEEE802.11ax, and indicates an activation timing needed for a plurality of STAs (terminals) to simultaneously transmit frames to an AP, wireless channel information using the frame, and the like.

In a TF 1000, a Frame Control field 1001 is a field common to the IEEE802.11 series. In this embodiment, a value indicating that the frame is a trigger frame of IEEE802.11ax is stored. The length is 2 octets (bytes). A detailed description of a Duration field 1002, an RA (Receiver Address) field 1003, and a TA (Transmitter Address) field 1004 will be omitted. A Common Info field 1005 indicates information common to a plurality of STAs that are the destination of the TF. A detailed configuration of the Common Info field 1005 is shown in the middle of FIG. 10. A Per User Info field 1006 indicates individual information for each STA as the destination of the TF. The length of the field is 5 octets or more. A Padding field 1007 is used to give a time to an STA group that has received the TF. In the IEEE802.11 standard, the AP can decide the time based on the value of a MinTrigProcTime requested from each STA. In general, a padding corresponding to the maximum value of MinTrigProcTime requested from the plurality of STAs as the destination of the TF is used. A detailed description of an FCS (Frame Check Sequence) 1008 will be omitted.

In the configuration of the Common Info field 1005 shown in the middle of FIG. 10, details of a Trigger Type subfield 1011 are as shown in the table on the lower side of FIG. 10. For example, if the TF is a C-OFDMA TF, the value of the Trigger Type subfield 1011 is 8. A Length subfield 1012 indicates a length corresponding to the type of the Trigger Type subfield 1011. A Trigger Type dependent subfield 1013 indicates a description corresponding to the type of the Trigger Type subfield 1011.

As described above, when collection and assignment of information concerning the resource are coordinately performed by the AP and the STA, an effect of implementing fast and efficient wireless communication by the multi-AP coordination configuration can be obtained. It is therefore possible to implement improvement of the use efficiency of a wireless medium, and the communication speed and stability of the entire system and individual devices.

Note that in the above-described embodiment, an operation of performing AP coordination in the DL (Downlink) based on a BQR has been described. However, an embodiment of an UL (Uplink) is also possible. For example, the AP acquires, from the STA, a BSR (Buffer State Report) representing the data amount in the AP direction (that is, UL) and the type of the data (an access category such as video or audio). After recognizing the state of the resource based on the BQR, the AP can perform resource assignment for UL based on the BSR by the TF (trigger frame) shown in FIG. 9.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An access point apparatus complying with an IEEE802.11 series standard, comprising:
at least one memory that stores a set of instructions; and
at least one processing circuit that executes the set of instructions to cause the access point apparatus to:
receive, from a station apparatus, a Medium Access Control (MAC) frame, wherein the MAC frame includes a first subfield and a second subfield, wherein the first subfield represents whether an Uplink Multi User (UL MU) communication function is supported or not, wherein the UL MU communication function is a function of transmitting data in response to a triggering frame, and wherein the second subfield is used to represent whether the UL MU communication function is enabled or disabled;
determine, by interpreting the the first subfield and the second subfield, that the UL MU communication function is enabled by the station apparatus in a case where the first subfield represents that the UL MU communication function is supported by the station apparatus and the second subfield contains a value to represent that the UL MU communication function is enabled; and
determine, by interpreting the first subfield and the second subfield, that the UL MU communication function is disabled by the station apparatus in a case where the first subfield represents that the UL MU communication function is supported by the station apparatus and the second subfield contains a value to represent that the UL MU communication function is suspended.

2. The access point apparatus according to claim 1, wherein the MAC frame further comprising a third subfield and a fourth subfield. wherein the third subfield indicates whether transmitting a Bandwidth Query Report (BQR) that represents a state of a communication resource usable by the station apparatus is supported by the station apparatus, and the fourth subfield indicates whether transmitting the BQR is enabled or disabled by the station apparatus,
wherein, in a case where the third subfield represents that the BQR is supported and the fourth subfield represents that the BQR is enabled, the access point apparatus transmits the trigger frame.

3. The access point apparatus according to claim 1, wherein the MAC frame includes a MAC header and a frame body, wherein the MAC header includes a HT control field that includes the second subfield.

4. The access point apparatus according to claim 2, wherein when the access point apparatus performs coordination communication with another access point apparatus by coordinately using a predetermined frequency band, the access point apparatus decides the communication resource used to communicate with the station apparatus and the other access point apparatus based on the BQR acquired from the station apparatus and a BQR acquired from the other access point apparatus.

5. A control method of an access point apparatus complying with an IEEE802.11 series standard, comprising:
receiving from a station apparatus, a Medium Access Control (MAC) frame, wherein the MAC frame includes a first subfield and a second subfield, wherein the first subfield represents whether an Uplink Multi User (UL MU) communication function is supported or not, wherein the UL MU communication function is a function of transmitting data in response to a triggering frame, and wherein the second subfield is used to represent whether the UL MU communication function is enabled or disabled;
determining, by interpreting the first subfield and the second subfield, that the UL MU communication function is enabled by the station apparatusacquiring, from the station apparatus, a Bandwidth Query Report (BQR) representing a state of a communication resource usable by the station apparatus, by transmitting a BQR poll (BQRP) to the station apparatus in a case where the first subfield represents that the UL MU communication function is supported by the station apparatus and the second subfield contains a value to represent that the UL MU communication function is enabled in the station apparatus; and determining, by interpreting the first field and the second field, that the UL MU communication function is suspended by the station apparatus in a case where the first subfield represents that the UL MU communication function is supported by the station apparatus and the second subfield contains a value to represent that the UL MU communication function is disabled.

6. A non-transitory computer-readable storage medium storing a computer program for causing a computer to execute a control method of an access point apparatus complying with an IEEE802.11 series standard, the method comprising:

receiving from a station apparatus, a Medium Access Control (MAC) frame, wherein the MAC frame includes a first subfield and a second subfield, wherein the first subfield represents whether an Uplink Multi User (UL MU) communication function is supported or not, wherein the UL MU communication function is a function of transmitting data in response to a triggering frame, and wherein the second subfield is used to represent whether the UL MU communication function is enabled or disabled;

determining, by interpreting the first subfield and the second subfield, that the UL MU communication function is enabled by the station apparatus in a case where the first subfield represents that the UL MU communication function is supported by the station apparatus and the second subfield contains a value to represent that the UL MU communication function is enabled; and determining, by interpreting the first subfield and the second subfield, that the UL MU communication function is suspended by the station apparatus in a case where the first subfield represents that the UL MU communication function is supported by the station apparatus and the second subfield contains a value to represent that the UL MU communication function is disabled.

7. A station apparatus complying with an IEEE802.11 series standard, comprising:

at least one memory that stores a set of instructions; and at least one processing circuit that executes the set of instructions to cause the station apparatus to:

transmit, to an access point apparatus, a Medium Access Control (MAC) frame, wherein the MAC frame includes a first subfield and a second subfield, wherein the first subfield represents whether an Uplink Multi User (UL MU) communication function is supported or not, wherein the UL MU communication function is a function of transmitting data in response to a triggering frame and wherein the second subfield is used to represent whether the UL MU communication function is enabled or disabled;

wherein the MAC frame represents that the UL MU communication function is enabled by the station apparatus, in a case where the first subfield represents that the UL MU communication function is supported by the station apparatus and the second subfield contains a value to represent that the UL MU communication function is enabled; and wherein the MAC frame represents that the UL MU communication function is disabled by the station apparatus, in a case where the first subfield represents that the UL MU communication function is supported by the station apparatus and the second subfield contains a value to represent that the UL MU communication function is suspended.

8. The station apparatus according to claim 7, wherein the computer-readable instruction causes, when executed by the one or more processors, the station apparatus to receive a trigger frame for requesting transmission of a Bandwidth Query Report (BQR), wherein in a case where it is notified that the UL MU communication function is enabled, the station apparatus transmits the BQR to the access point apparatus in accordance with reception of the trigger frame.

9. A control method of a station apparatus complying with an IEEE802.11 series standard, comprising:

generating a Medium Access Control (MAC) frame;

transmitting, to an access point apparatus, the MAC frame, wherein the MAC frame includes a first subfield and a second subfield, wherein the first subfield represents whether an Uplink Multi User (UL MU) communication function is supported or not, wherein the UL MU communication function is a function of transmitting data in response to a triggering frame, and wherein the second subfield is used to represent whether the UL MU communication function is enabled or disabled;

wherein the MAC frame represents that the UL MU communication function is enabled by the station apparatus, in a case where the first subfield represents that the UL MU communication function is supported by the station apparatus and the second subfield contains a value to represent that the UL MU communication function is enabled; and wherein the MAC frame represents that the UL MU communication function is suspended by the station apparatus, in a case where the first subfield represents that the UL MU communication function is supported by the station apparatus and the second subfield contains a value to represent that the UL MU communication function is disabled.

10. A non-transitory computer-readable storage medium storing a computer program for causing a computer to execute a control method of a station apparatus complying with an IEEE802.11 series standard, the method comprising:

generating a Medium Access Control (MAC) frame;

transmitting, to an access point apparatus, the MAC frame, wherein the MAC frame includes a first subfield and a second subfield, wherein the first subfield represents whether an Uplink Multi User (UL MU) communication function is supported or not, wherein the UL MU communication function is a function of transmitting data in response to a triggering frame, and wherein the second subfield is used to represent whether the UL MU communication function is enabled or disabled;

wherein the MAC frame represents that the UL MU communication function is enabled by the station apparatus, in a case where the first subfield represents that the UL MU communication function is supported by the station apparatus and the second subfield contains a value to represent that the UL MU communication function is enabled; and wherein the MAC frame represents that the UL MU communication function is suspended by the station apparatus, in a case where the first subfield represents that the UL MU communication function is supported by the station apparatus and the second subfield contains a value to represent that the UL MU communication function is suspended.

11. An access point apparatus complying with an IEEE802.11 series standard, comprising:
a wireless LAN controller including at least one circuit that is configured to receive, from a station apparatus, a Medium Access Control (MAC) frame, wherein the MAC frame includes a first subfield and a second subfield, wherein the first subfield represents whether an Uplink Multi User (UL MU) communication function is supported or not, wherein the UL MU communication function is a function of transmitting data in response to a triggering frame, and wherein the second subfield is used to represent whether the UL MU communication function is enabled or disabled; and
a controller including:
at least one memory that stores a set of instructions; and
at least one processing circuit that executes the set of instructions to cause the access point apparatus to:
determine, by interpreting the first subfield and the second subfield, that the UL MU communication function is enabled by the station apparatus in a case where the first subfield represents that the UL MU communication function is supported by the station apparatus and the second subfield contains a value to represent that the UL MU communication function is enabled; and
determine, by interpreting the first subfield and the second subfield, that the UL MU communication function is suspended by the station apparatus in a case where the first subfield represents that the UL MU communication function is supported by the station apparatus and the second subfield contains a value to represent that the UL MU communication function is disabled.

\* \* \* \* \*